UNITED STATES PATENT OFFICE.

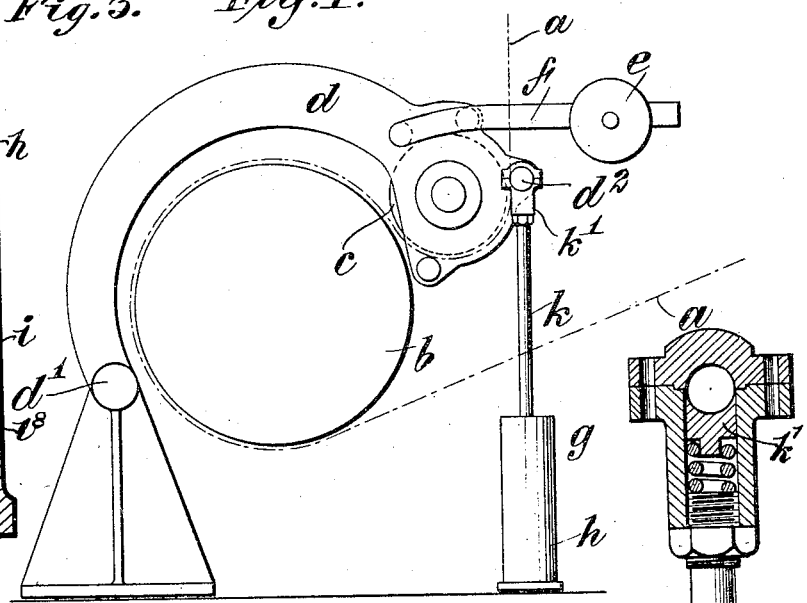
P. T. LINDHARD.
DASH POT.
APPLICATION FILED AUG. 25, 1910.
1,057,648.
Patented Apr. 1, 1913.
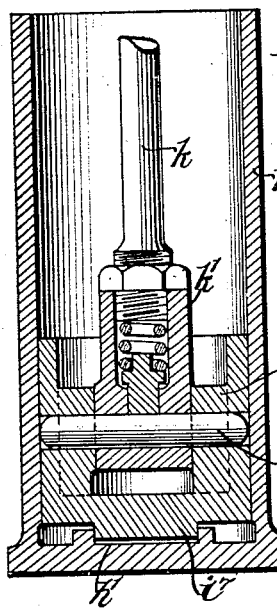
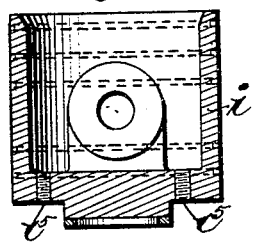
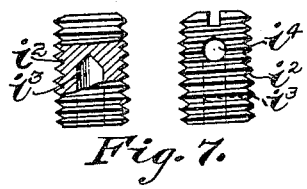
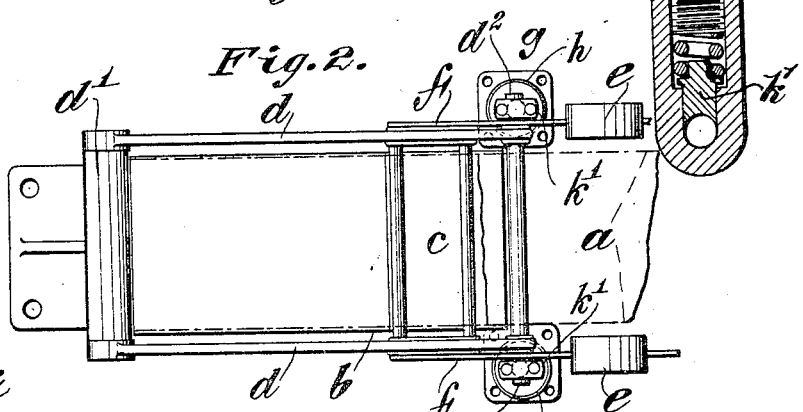
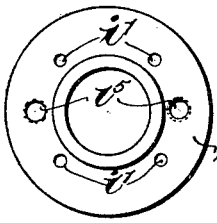

POVL T. LINDHARD, OF NEW YORK, N. Y.

DASH-POT.

1,057,648.   Specification of Letters Patent.   Patented Apr. 1, 1913.

Application filed August 25, 1910. Serial No. 578,879.

*To all whom it may concern:*

Be it known that I, POVL T. LINDHARD, a subject of the King of Denmark, residing at Flatbush, in the borough of Brooklyn of the city of New York, in the State of New York, have invented certain new and useful Improvements in Dash-Pots, of which the following is a specification, reference being had to the accompanying drawings, forming a part hereof.

The present invention is herein illustrated and described as applying to a movable belt tightener in order that its true nature and functions may be more readily appreciated. The conditions prevailing in the use of belt tighteners are typical of those found in certain apparatus which require means to compensate for wide fluctuations in pressure. A discussion of these conditions as found in the movable belt tightener will serve to emphasize the need of such a device as herein provided.

It is usual to increase the efficiency of a belt drive by causing an idler to be pressed against the slack side of the belt, thereby increasing the arc of contact between the belt and one or both of the pulleys. The idler is commonly pressed against the belt by a dead weight applied directly to the frame which carries the idler, when the position of the idler will permit such application, or connected to the frame by suitable connections. It has also been proposed to use springs for the purpose, but they are not satisfactory because they do not produce uniform tension in the belt for different positions of the idler, especially when the idler may have a considerable range of movement. The application of a dead weight to the frame of the idler has therefore been employed most generally for the purpose, but even this is open to objection for the reason that sudden fluctuations of the load driven by the belt frequently cause such variations in the slack side of the belt as to cause the idler to jump free of the belt thereby permitting the belt to slip more or less upon the pulleys. This is very destructive to the belt as well as to the mechanism driven thereby.

It is the object of this invention to provide means for preventing such jumping of the idler or belt tightener without interfering with such freedom of movement thereof as is necessary to the proper operation of the device, and in accordance with the invention there is combined with the idler or belt tightening device a retarding device, which prevents the jumping of the idler away from the belt without interfering with its relatively slower movement in the same direction in contact with the belt and without at all interfering with its freedom of movement toward the belt.

The invention will be more fully explained hereinafter with reference to the accompanying drawings in which it is illustrated, and in which—

Figure 1 is a view in elevation illustrating the application of the device to a belt drive of a well known type. Fig. 2 is a top view of the parts shown in Fig. 1. Figs. 3–8 are detail views illustrating features of construction of the retarding device shown in Figs. 1 and 2.

Referring to the embodiment of the invention shown in Figs. 1–8 it will be seen that the belt tightener, to which, in Figs. 1 and 2, the retarding device is shown as applied, is of a well known type the pulley $b$ and belt $a$ being herein illustrated in a conventional manner and merely for the sake of clearness. The belt tightener, arranged to be movable with fluctuations in the tension of the belt, comprises an idler $c$ and a movable frame $d$ in which the idler is mounted, the frame being shown as pivoted, as at $d'$, to a suitable standard on the opposite side of the pulley $b$ to that on which the idler $c$ is arranged. The weight of the idler and its frame may be in itself sufficient to press the idler against the belt with sufficient force to give the desired tension, but as is usual in belt tighteners of the type shown, an additional weight or weights $e$ may be applied to the belt tightener through arms $f$ which may be turned back to move the center of gravity nearer the pivot $d'$ of the frame when it is desired to turn the idler back from the belt. The pressure of the idler toward the belt, in this case, being downward, the idler should be entirely free to move in a downward direction and should be acted upon by a retarding device to check or prevent sudden movement in an upward direction, under the influence of sudden fluctuations in the load, while the slow upward movement of the tightener, with ordinary variations in the tension of the belt, should take place without substantial interference. This retarding device, as already indicated, must not have either the characteristics of a dead weight, or the characteristics of a yielding spring but it must have the characteristics of a dash pot which permits free movement of the belt tightener in one direction and in the opposite direction offers resistance which is uniform for all ranges of movement at a given velocity, but increases with increased velocity of movement. For this purpose there is connected to the frame $d$ a dash-pot $g$, in which any desired fluid medium may be employed, preferably oil, while the parts thereof are so arranged as to permit the desired effects to be produced. Such a construction and arrangement of parts is shown in the detail views, Figs. 3–8.

The cylinder $h$ may be of ordinary construction, being shown as open at its upper end. In the cylinder is disposed a piston $i$ which is connected by a rod $k$ with the belt tightener frame $d$. The piston shown has holes $i'$ therethrough which are threaded and provided with chuck screws $i^2$, shown in detail in Fig. 7 and having a center bore $i^3$ with a lateral channel $i^4$ whereby so much of the mouth of the lateral channel $i^4$ may be exposed above the surface of the piston as will so restrict the passage of oil or other fluid through the piston, as it moves in an upward direction, as to give the necessary resistance or drag at a high speed without preventing the free movement of the piston upward at slow speed. The piston also has one or more holes $i^5$ therethrough, in each of which is fitted a check valve $i^6$ of ordinary construction and arranged to open upward as the piston moves downward so as to afford a free passage for the oil, or other fluid, through the piston, the free downward movement of the piston, under the influence of the weight of the belt tightner, therefore not being interfered with. To prevent shock when the piston reaches the bottom of the cylinder, the piston $i$ may be provided with a cylindrical projection $i^7$ which fits somewhat closely in a cylindrical recess $h'$ in the bottom of the cylinder so that the resistance to the downward movement of the cylinder, as it reaches the bottom of the cylinder, becomes considerable. In order to diminish somewhat the effect of very severe shocks, the piston rod $k$ is preferably provided, as shown in Fig. 6, at one or at each end, with a spring supported pillow-block $k'$ which bears against the corresponding connection, forming a part of the bearing of the piston rod on the pin $d^2$ of the belt-tightener frame or the pin $i^8$ of the piston, as the case may be.

It will be obvious that various changes in details of construction and arrangement may be made to suit different conditions of use without departing from the spirit of the invention.

I claim as my invention:

A dash pot comprising a cylinder, a piston in said cylinder, means to retard the movement thereof in one direction including a plurality of ducts therethrough, chuck screws removably threaded in certain of said ducts and each having a center bore with a lateral channel therethrough whereby the discharge area may be regulated, check-valve members removably threaded in the remaining ducts, a cylindrical projection on the piston adapted to seat in a similar recess in the bottom of the cylinder to further retard the piston in its downward movement and a spring supported pillow block removably carried in one end of the piston to bear against the corresponding connected part to diminish the shocks thereon.

This specification signed and witnessed this 30th day of July, A. D., 1910.

POVL T. LINDHARD.

Signed in the presence of—
AMBROSE L. O'SHEA,
E. A. GERKER.